Sept. 11, 1951 N. M. LAWLESS 2,567,672
SERVICING MECHANISM FOR VEHICLES
Filed April 21, 1948 3 Sheets-Sheet 1
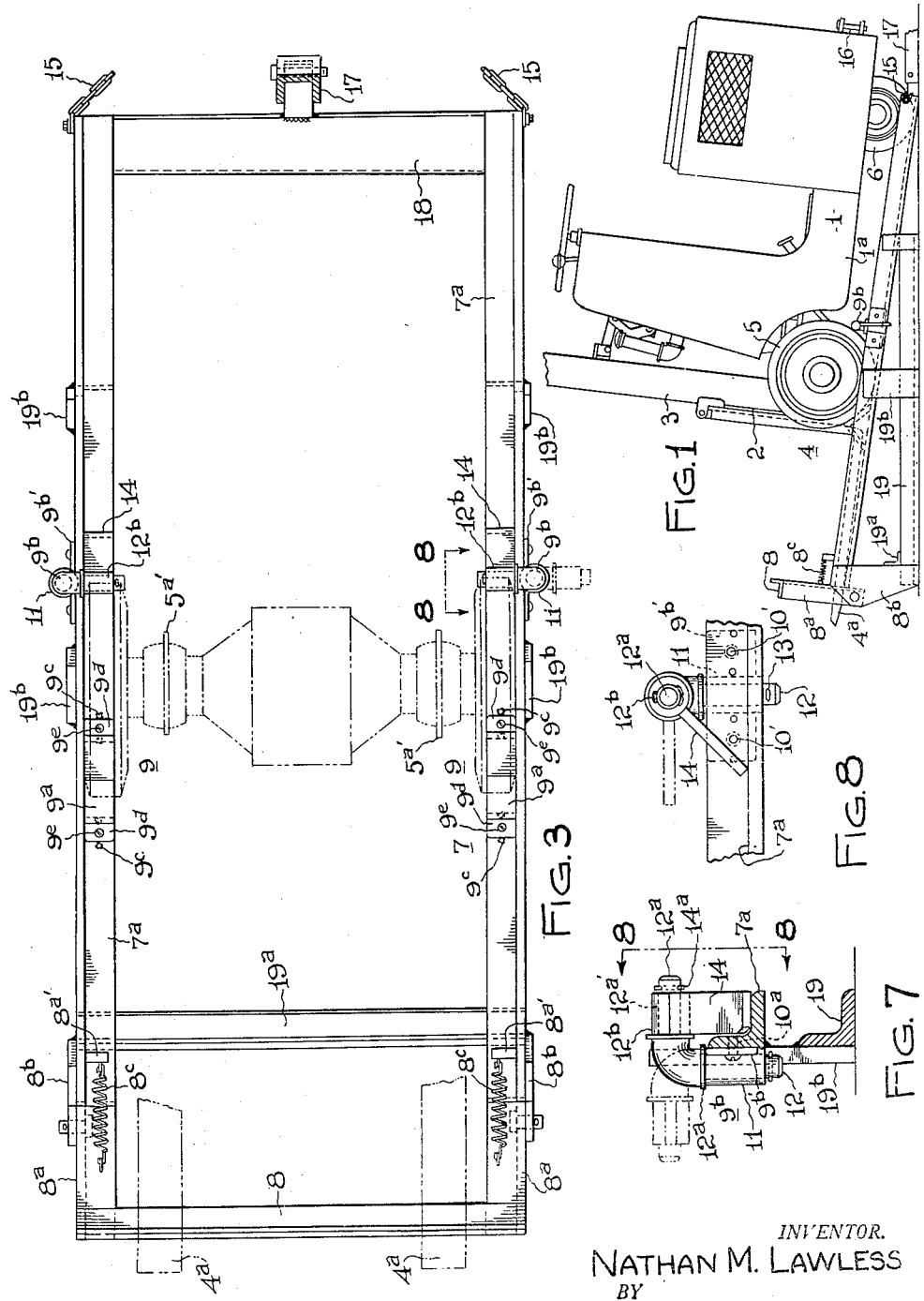
INVENTOR.
NATHAN M. LAWLESS
BY
*Geo. B. Pitts*
ATTORNEY.

Sept. 11, 1951 N. M. LAWLESS 2,567,672
SERVICING MECHANISM FOR VEHICLES
Filed April 21, 1948 3 Sheets-Sheet 2
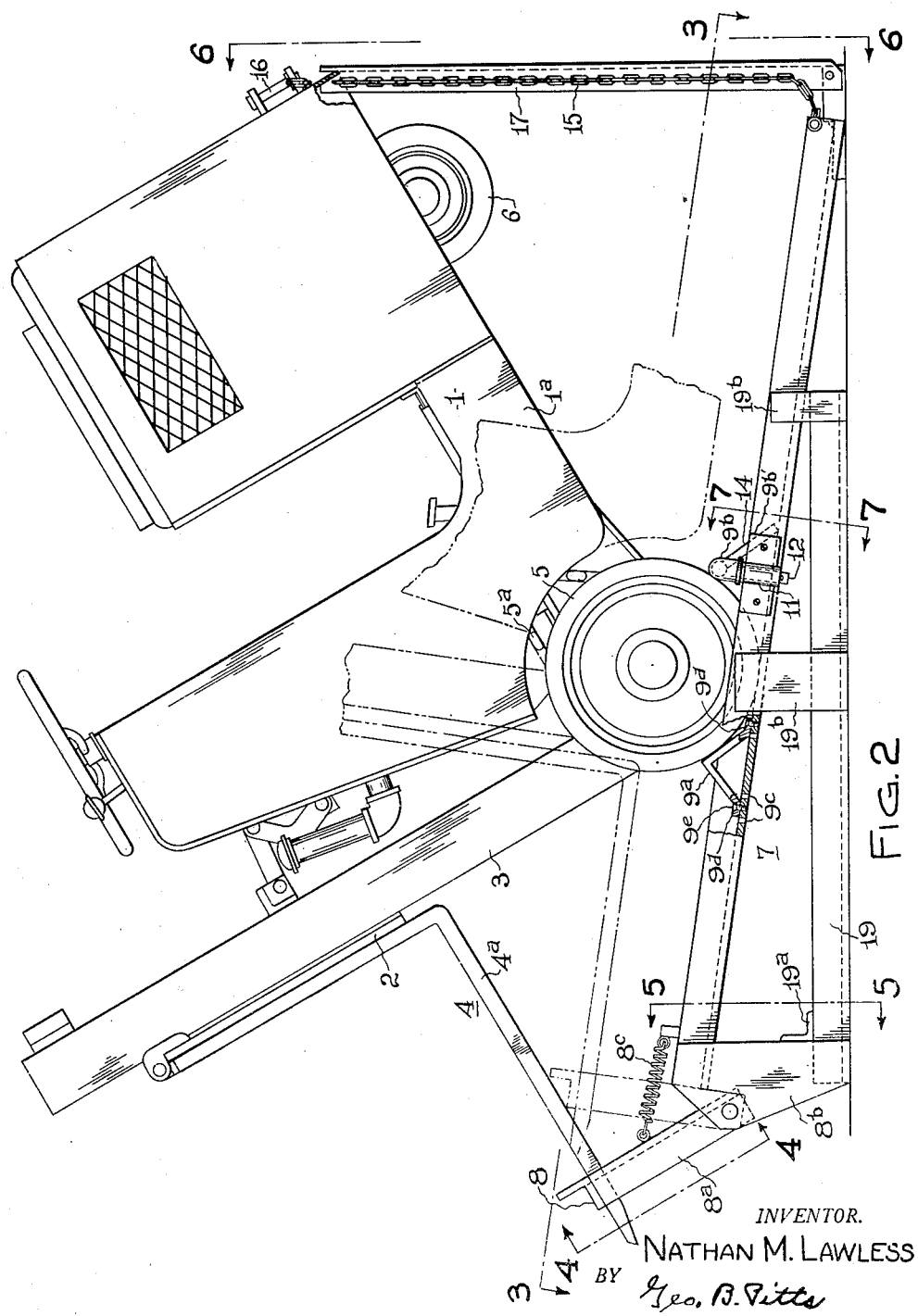
INVENTOR.
NATHAN M. LAWLESS
BY Geo. B. Pitts
ATTORNEY.

Sept. 11, 1951  N. M. LAWLESS  2,567,672
SERVICING MECHANISM FOR VEHICLES
Filed April 21, 1948  3 Sheets-Sheet 3
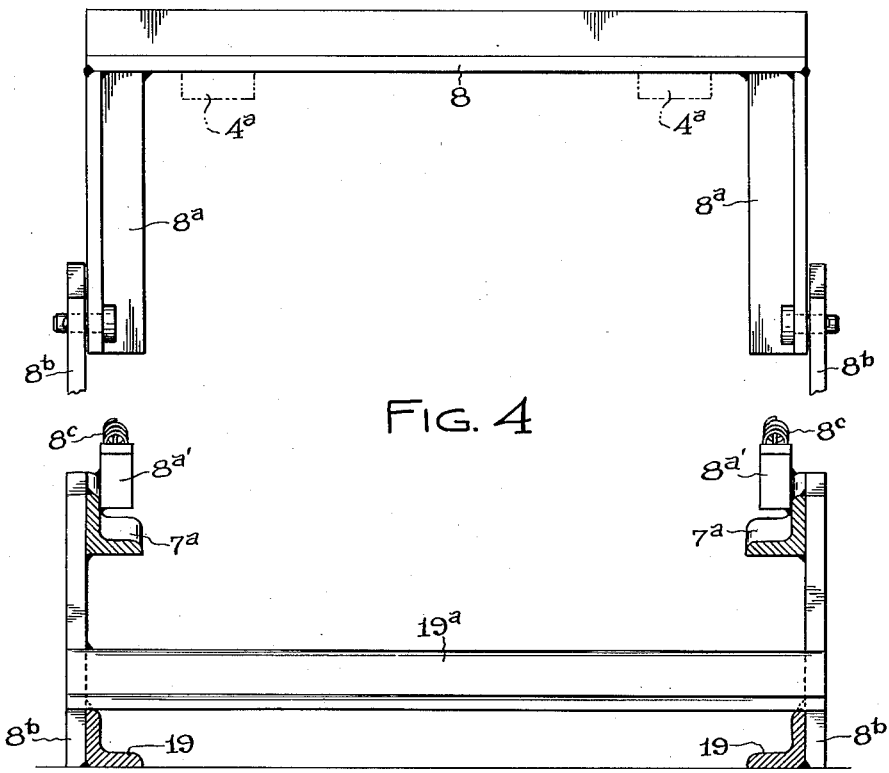
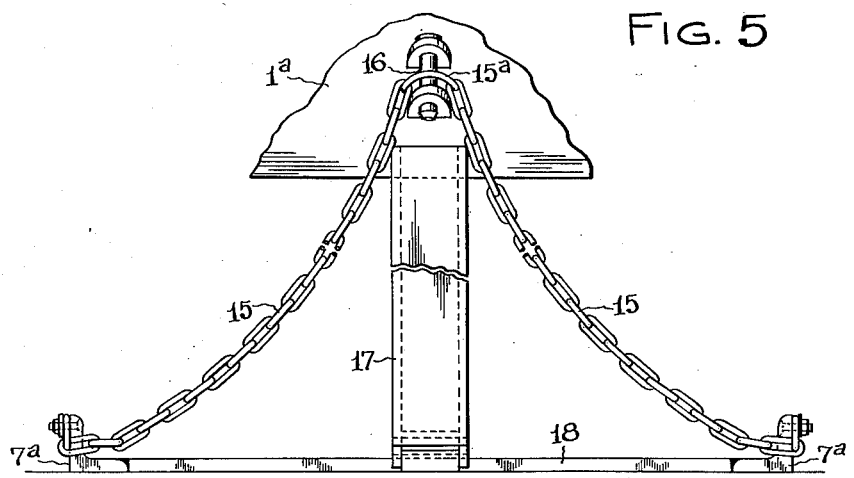
INVENTOR.
NATHAN M. LAWLESS
BY
Geo. B. Pitts
ATTORNEY.

Patented Sept. 11, 1951

2,567,672

UNITED STATES PATENT OFFICE 2,567,672

SERVICING MECHANISM FOR VEHICLES

Nathan M. Lawless, Muskegon Heights, Mich., assignor to The Baker-Raulang Company, Cleveland, Ohio, a corporation of Ohio Application April 21, 1948, Serial No. 22,345

6 Claims. (Cl. 214—1)

This invention relates to a mechanism for servicing vehicles, more particularly trucks having a member or device and equipment on the trucks for moving the member or device upwardly and downwardly, whereby the device may engage an element forming part of the mechanism and operate as a jack for raising one end of the truck into an accessible position for inspection, painting, greasing or repair. The invention is especially useful for servicing trucks (which are pushed or pulled manually or power driven) having an elevating load carrier, as trucks of this type, in most instances, have chassis supported in close relation to the ground, flooring or driving lanes, whereby servicing and repair becomes laborious or impossible, unless a well is available for positioning the truck in an overhead position. The invention is, for illustrative purposes, shown in connection with a self propelled industrial truck having a power operated elevating member.

One object of the invention is to provide an improved mechanism for servicing vehicles and having a member adapted to be engaged by a raising and lowering device on the vehicle, the operation of which device is utilized as a jack to raise one end of the vehicle.

Another object of the invention is to provide an improved mechanism for servicing vehicles, of simple construction consisting of standard metal sections adapted to be readily assembled to provide a runway and a member arranged to be engaged by a raising and lowering device on the vehicle.

Another object of the invention is to provide an improved servicing mechanism for vehicles comprising a frame providing a runway and an engageable member, the frame being of skeleton construction to insure economical fabrication and to reduce its weight, whereby the mechanism can be readily installed, moved or repositioned from time to time.

Another object of the invention is to provide an improved servicing mechanism for vehicles, having a runway and a member with which a raising and lowering device on the vehicle engages to raise one end of the vehicle, the runway being inclined to increase the gap or space between the raised end of the truck and the runway, whereby accessibility is facilitated and a larger portion of the truck is made available for inspection, servicing and repair.

Other objects of the invention will be apparent to those skilled in the art to which my invention relates from the following description taken in connection with the accompanying drawings, wherein Fig. 1 is a side elevation of a mechanism embodying my invention and showing a truck in position to be operated.

Fig. 2 is a view similar to Fig. 1, but showing the truck operated into tilted position.

Figs. 3, 4, 5, 6 and 7 are sections on the lines 3—3, 4—4, 5—5, 6—6 and 7—7, respectively, of Fig. 2.

Fig. 8 is a fragmentary elevation on the line 8—8 of Figs. 3 and 7.

In the drawings, 1 indicates a vehicle consisting of an industrial truck having an elevating member 2 slidably mounted on guides 3. The member 2 is provided with a load carrier 4 shown as consisting of forks 4a. The power means for raising the member 2 are not shown, but such means may be of any well known form of construction. The truck chassis 1a is mounted on wheels 5, 6, either of which may be driven and either or all of the wheels may be steerable. The advancing end of the chassis is provided with a pair of wheels 5, whereas the opposite end may be provided with one or a pair of wheels 6. In the form of truck construction chosen for illustrative purposes, the front wheels 5 are driven by a suitable transmission, including chains 5a engaging sprockets 5a' and the rear wheels 6 are steerable.

7 indicates a runway preferably of a length to accommodate both pairs of wheels. The runway consists of suitable tracks 7a, 7a, preferably in the form of angle bars, suitably rigidly connected in spaced parallel relation, as later set forth. 8 indicates a cross member swingably mounted on the front ends of the runway tracks and adapted to be removably engaged by the forks 4a, 4a. The cross member 8 is connected at its opposite ends to the outer ends of arms 8a which are pivotally mounted at their inner ends on brackets 8b fixedly related to the tracks 7a. Each bracket 8b is welded to the outer side of the vertical or side wall of the adjacent track 7a and the adjacent arm 8a is pivoted on the inner face of the bracket. In this arrangement springs 8c, each connected at its opposite ends to one of the arms 8a and a lug 8a' on the adjacent track 7a, serve to hold the arms in yielding engagement with the ends of the tracks 7a, whereby the latter form stops to limit the inward swinging movement of the cross member 8 and support it in normal position for initial engagement by the forks 4a, 4a, when the truck is driven onto the runway 7.

As shown, the arms 8a are pivoted on the brackets 8b forward of the track ends, so that when they are in normal position the arms extend at right angles to the tracks 7a. As the vehicle forks are disposed parallel to the runway tracks 7a and the guides 3 for the member 2, which supports the forks, are perpendicular to the forks, the upward initial pressure of the forks on the member 8 is in a direction longitudinally of the arms 8a and at right angles to that of the forks and as the arms are pivotally mounted and swing as a unit with the forks, this parallelism is maintained throughout the tilting movement of the vehicle.

9 indicates as an entirety means provided on the tracks 7a, 7a, for anchoring the wheels 5 thereon to prevent movement of the vehicle during servicing thereof. The anchoring means 9 comprise pairs of spaced front and rear abutments 9a, 9b, each pair being mounted on one of the tracks 7a in the path of movement of one of the wheels 5. The abutments of each pair on each track are adjustable longitudinally of the adjacent track 7a, as later set forth, and each fixed thereto in alinement with the corresponding abutment on the other track. Each front or forward abutment 9a preferably consists of an inverted V-member secured to the adjacent track 7a in the path of movement of one of the wheels 5. The abutments 9a on the tracks 7a being in transverse alinement serve to limit the inward movement of the vehicle at a predetermined position with the forks 4a projected below and beyond the fork engaging member 8, as shown in Fig. 1. Due to the fact that the position of the carrier 4 with respect to the front wheels 5 and/or the forks or other load carrier elements may vary in length, provision is made for adjusting the abutments 9a longitudinally of the tracks 7a. In the illustrated form of construction, each track 7a is formed with a series of openings 9c disposed longitudinally thereof, each opening 9c being in alinement with one of the openings 9c formed in the other track, and the opposite ends of the V-member 9a are provided with extensions 9d in face-to-face engagement with the adjacent track 7a and adjustable therealong. Each extension 9d is formed with an opening alined with one of the openings 9c so that a screw or bolt 9e may be inserted in the openings to secure the extension 9d to the track, the head of the screw or bolt preferably being countersunk in the adjacent extension 9d. The openings 9c formed in each track 7a are so spaced that in any adjustment of the abutment 9a, each opening in each extension 9d will register with one of the openings 9c in the track. Each abutment 9b consists of an elongated support 9b' formed with openings 10 in its opposite end portions arranged to register with openings 10a formed in the side wall of the adjacent track 7a, said openings being adapted to receive screws or bolts 10' to secure the support to the track side wall. The side wall of the track 7a or the support 9b' may be provided with a plurality of openings to permit the positioning of the support 9b' at selected positions on the track side wall. Intermediate its opposite ends each support 9b' is provided with a tube 11 preferably welded to the support and disposed at right angles to the adjacent track 7a. The inner wall of the tube 11 provides a bearing for a shaft 12. The shaft 12 is provided with a collar 12a which engages the upper end of the tube 11, whereas the lower end of the shaft 12 below the tube is provided with a cotter pin 13 to prevent endwise movement of the shaft upwardly. The shaft 12 extends upwardly to a level above the side wall of the track and provided at its upper end with a laterally disposed arm 12a'. The outer end portion of the arm 12a' is reduced and forms a shaft to rotatably support a collar 12b. The collar 12b is provided with a radially extending wall 14, the outer end of which is adapted to engage with and be supported on the adjacent track 7a as shown in Figs. 2, 3, 7 and 8. The wall 14 may be swung into engagement with the adjacent track at either side of the arm 12a', but when disposed as shown in Figs. 1 and 2, the adjacent wheel 5 engages the collar 12b on the arm 12a' and the latter is held in position by the engagement of the wall 14 with the side wall of the track. A cotter pin 14a is provided on the outer end of the shaft 12a' to maintain the collar 12b on the shaft and against the shoulder at the inner end thereof.

15 indicates flexible members, such as chains, connected at their outer ends to the rear ends of the tracks 7a. The inner ends of the chains are suitably connected together by a link 15a which in turn is adapted to be detachably connected to an element (such as a coupling device) 16 provided on the adjacent end of the vehicle chassis. 17 indicates a prop preferably consisting of a channel bar pivotally connected at its lower end to a cross bar 18 intermediate the opposite ends thereof, which cross bar spacedly connects the rear ends of the tracks 7a together. The upper end of the prop 17 is adapted to engage the adjacent end of the vehicle chassis 1a, when the latter is tilted (see Fig. 2) and co-operate with the anchored wheels 5 to support the chassis in tilted position and thus relieve strain on the carrier 4 and front portion of the runway 7 in the event the operator has not lowered the carrier 4 from engagement with the member 8.

The runway 7 is preferably inclined to the flooring, as shown in Fig. 1. This arrangement of the runway 7 is advantageous for the reason that when the vehicle is tilted, a larger gap is provided between the under side of the chassis 1a and the runway to insure increased accessibility thereto, whereby servicing to practically all parts supported by the chassis is greatly facilitated. In this arrangement of the runway 7, I provide a base structure consisting of a pair of angle bars 19 and spacedly connected together by a cross member 19a and side studding 19b, these parts being suitably welded together.

In operation, the abutments 9a, 9b, are adjustably secured to the tracks so as to accommodate the wheels 5 in relation to the distance the forks 4a extend from the axis of the wheels 5, so that when the wheels 5 engage the abutments 9a, the end portions of the forks 4a will project beyond the fork engaging member 8, a slight distance so as to obtain a maximum leverage between the axis on which the vehicle tilts and the point of engagement of the forks 4a with the member 8. With the abutments 9b in displaced position, as shown in dotted lines in Fig. 7, the vehicle 1 is then driven on the runway and the wheels 5 engaged with the abutments 9a as shown in dotted lines in Fig. 1; next the abutments 9b are placed in position (Fig. 2) and the chains 15 connected to the coupling pin 16. Next, the elevating member is raised, the effect of which is to tilt the vehicle about the axis of the wheels 5 (see full lines in Fig. 2). By setting the prop 17 in supporting position and lowering the forks 4a to tilt the vehicle in the opposite direction to engage the chassis with the prop the vehicle will be maintained in the tilted position.

To re-set the vehicle in normal or driving position, the forks 4a are raised to effect an upward tilt of the vehicle to permit removal of the prop 17; next, the forks 4a are lowered until the wheels 6 engage the tracks 7a.

To those skilled in the art to which my invention relates many changes in construction and widely differing embodiments and applications thereof will be apparent without departing from the spirit and scope of the invention. My description and the disclosures herein are purely illustrative and not intended to be in any sense limiting.

What I claim is:

1. In a vehicle servicing mechanism, the combination of a pair of parallel tracks forming a runway for the wheels of a vehicle having at one end a device mounted thereon to move vertically and means for raising the device, a transversely disposed member mounted at the forward end of the runway above and in spaced relation thereto and adapted to be engaged by the device when the latter is raised, and an abutment fixed to one of said tracks in the path of movement of one of the vehicle wheels adjacent the vertically movable device for limiting the movement of the vehicle toward said member with the outer end portion of the vertically movable device disposed below and extending beyond said member, and a displaceable member movably mounted on said track rearwardly of said abutment and arranged to be positioned rearwardly of the vehicle wheel to prevent movement of the vehicle outwardly relative to said runway, the raising of the vertically movable device by the raising means therefor serving to move it into engagement with said member and to co-act therewith to tilt the vehicle about the axle for the adjacent vehicle wheels.

2. In a vehicle servicing mechanism, the combination of a pair of parallel tracks forming a runway for the wheels of a vehicle having a device capable of being raised and lowered, a member at the forward end of said runway adapted to be engaged by the device when the latter is raised, an abutment fixed to one of said tracks in the path of movement of the adjacent advancing vehicle wheel for limiting the movement of the vehicle inwardly toward said member, and a separate member movably mounted on said track rearwardly of and in spaced relation to said abutment and arranged to be positioned rearwardly of and adjacent to the rear side of one of said advancing vehicle wheels to prevent movement of the vehicle outwardly on said runway, said separate member consisting of a shaft rotatably mounted at one side of the track and provided at its upper end with a laterally extending arm swingable into overhanging relation to said track, and a collar rotatably mounted on said arm and provided with a radially extending wall adapted to be swung into engagement with said track.

3. In mechanism for servicing a vehicle having at one end an outwardly extending raisable member and means for raising said member, the combination of a runway for the wheels of the vehicle, means intermediate the ends of the runway for anchoring the advancing pair of wheels of the vehicle thereto when the vehicle is driven onto said runway, a device mounted on the forward end of said runway below which the raisable member is positioned when the vehicle is anchored to said runway, said device serving as a stop for the member when the latter is raised by said raising means, whereby, during continued raising of said member, the vehicle is tilted about the axis of the anchored wheels, and a prop at the rear end of said runway arranged to engage the tilted end of the vehicle and support the latter in tilted position.

4. In a vehicle servicing mechanism, the combination of a runway for the wheels of a vehicle having a device capable of being raised or lowered, a member on said runway adapted to be engaged by said device, and separate abutment means adjustably mounted on said runway and arranged in front and rearward of one of the wheels of the vehicle for anchoring the latter against movement on said runway, the rearward abutment means consisting of a support adjustably fixed to one side of the adjacent track, a shaft rotatable on said support and provided at its upper end with a laterally extending arm swingable into overhanging relation to said track, and a collar rotatably mounted on said arm and provided with a radially extending wall adapted to be swung into engagement with said track.

5. In mechanism for servicing a vehicle having at one end an outwardly extending device mounted to move vertically thereon and means for raising the device, the combination with a frame, of a runway on said frame for the wheels of the vehicle, one end of said runway being disposed adjacent the travel surface for the vehicle to permit the wheels thereof to be moved onto said runway, a transversely disposed member swingably supported on the opposite end of said runway, and a limiting device on said runway arranged to be engaged by one of the advancing wheels of the vehicle to position the latter on the runway with the outer end portion of the device on the vehicle extending below and beyond said transversely disposed member, so that in the upward movement of the device by the power raising means therefor the device initially engages said member and then co-acts therewith to tilt the vehicle about the axle of the adjacent vehicle wheels.

6. A mechanism as claimed in claim 5 wherein said runway is provided with an abutment for engaging the rear side of said first mentioned wheel, the abutment having a support adjustably fixed to the runway and movably supporting the abutment for movement into a displaced position.

NATHAN M. LAWLESS.

REFERENCES CITED

The following references are of record in the file of this patent:

UNITED STATES PATENTS

| Number | Name | Date |
|---|---|---|
| 1,102,773 | Martin | July 7, 1914 |
| 1,644,785 | Lunati | Oct. 11, 1927 |
| 1,908,959 | Cullen | May 16, 1933 |